United States Patent

Gonzalez

[15] 3,664,226
[45] May 23, 1972

[54] NUTS AND LOCK NUTS COUPLED IN ONE SINGLE UNIT FOR TIGHTENING AT A CONTROLLED TORSION

[72] Inventor: Cesar Fernandez-Veraud Gonzalez, Avenue Central 58, Mexico City, Mexico

[22] Filed: June 12, 1970

[21] Appl. No.: 45,760

[52] U.S. Cl. ................................................85/61, 151/15
[51] Int. Cl. ...................................F16b 31/02, F16b 39/12
[58] Field of Search ..................85/61, 62, 32 V; 151/15, 17, 151/16, 18; 81/52.4

[56] References Cited

UNITED STATES PATENTS

| 299,308 | 5/1884 | Williams | 151/16 |
|---|---|---|---|
| 726,740 | 4/1903 | O'Neil | 151/15 |
| 854,260 | 5/1907 | Wooddell | 151/18 |
| 1,075,521 | 10/1913 | Valentine | 151/16 |
| 1,380,395 | 6/1921 | Korach | 151/15 X |
| 1,966,414 | 7/1934 | Main | 85/61 UX |
| 2,016,000 | 10/1935 | Freeland | 151/15 |
| 2,394,812 | 2/1946 | Seitz | 85/61 |
| 3,191,486 | 6/1965 | Gibbens | 85/61 |
| 1,225,419 | 5/1917 | Donahue | 151/6 |

FOREIGN PATENTS OR APPLICATIONS

| 391,389 | 9/1965 | Switzerland | 151/16 |

Primary Examiner—Ramon S. Britts
Attorney—Finnegan, Henderson & Farabow

[57] ABSTRACT

Improvements on nuts and lock nuts characterized by their being threaded in one single unit and comprising two separate pieces namely: a lower nut portion properly said and an upper lock nut portion which simultaneously tightens said lower nut portion to a degree of delimited and adjustable torsion by means of the utilization of torsion clamps or wires which join the bodies of the nut and of the lock nut.

3 Claims, 6 Drawing Figures

INVENTOR
CESAR FERNANDEZ-VERAUD GONZALES
by
Finnegan, Henderson & Farabow
Attorneys INVENTOR
CESAR FERNANDEZ-VERAUD GONZALES
by
*Finnegan, Henderson & Farabow*
Attorneys

3,664,226

NUTS AND LOCK NUTS COUPLED IN ONE SINGLE UNIT FOR TIGHTENING AT A CONTROLLED TORSION

BACKGROUND OF THE INVENTION

1. Field of the Invention

The present invention is related to the industry that specializes in the manufacture of metallic pieces such as, nuts, screws and the like and is specially related to the industry which is engaged in the coupling or joining of pieces that require a considerably solid and determined firmness.

2. Description of the Prior Art

It is known that in order to join machinery pieces of common or high compression motors as well as to join any type of pieces subject to vibration, screws of different styles, forms and characteristics are used holding the threaded end of such screws by means of strongly tightened nuts.

Problems arise due to the fact that vibrations provoke the loosening of the nut demanded by the stress applied on the screw: and as this can produce or cause serious accidents, the experts in the art have tried to solve the problem in different manners among which we find the placing of washers or discs which separate the nut from the holding piece or the simple placement of double nuts.

It is also customary to make a passing groove in a longitudinal direction so that it is somewhat prolonged through the part of the stem which the nut will occupy and after the nut is well tightened, to place in the groove a bolt as a very tight quoin which prevents any movement of the nut. This system has the inconvenience of weakening the core of the screw which can break and, furthermore, if the nut moves ahead in a way that uncovers all the groove, the bolt does not exercise any pressure upon it, on the other hand, the bolt can be very easily lost.

Another procedure has been conceived which lies in the use of double nuts threaded in opposite directions for which the end of the screw must also be threaded in opposite directions so that each nut can be lodged in its corresponding part of the screw. But to make this possible it is necessary that the part of the stem nearest to the extremity have an outer diameter equal to the core of the upper part, somewhat diminished, so that the first nut can easily cross through the part of the screw that the second nut must cover; in this manner, of course, when the largest nut tries to get loose it will tend to tighten the lower one. To increase the staying on both nuts a groove that adjusts on a rib which has the same shape is arranged so that when such nuts are tightly fitted they are joined by these couplings in the limits of their adjustment.

This type of solution presents the inconvenience that the torsion at which the nuts are tightened is always the maximum of the capacity or strength of the operator or of the automatic tightening machines, the purpose of the present invention being the solution of that and many other inconveniences.

SUMMARY OF THE INVENTION

It is then the main purpose of the present invention to provide a nut and a locknut in a single unit which will allow tightening at a determined torsion consequently preventing the excess or lack of adjustment and slackening caused by vibrations.

Another object of the present invention is the provision of a nut and lock nut threaded on one single unit and longitudinally grooved in their outer portion as well as on their upper and lower surfaces with the finality of inserting clamps in the grooves holding the lock nut to the nut.

A further object of the present invention is to furnish bases for the manufacture of a nut and a lock nut joined among themselves by means of metal clamps with rupture points at different torsion degrees so as to fix the exact moment on which the nut has been adjusted, precisely in accordance with needs or finalities for the application of such nut.

An additional object of the present invention is to provide a nut and a lock nut threaded on a single unit and peripherally rabbeted on their upper and lower portions respectively in order to contain in the groove formed by the combination of such rabbets, a pressure stop manufactured of steel wire or of any other material depending on the degree of specific torsion limit desired on the tightening of the nut.

The preferred forms of the utilizable clamps in this nature are also shown in the same FIG.

Figure 2:
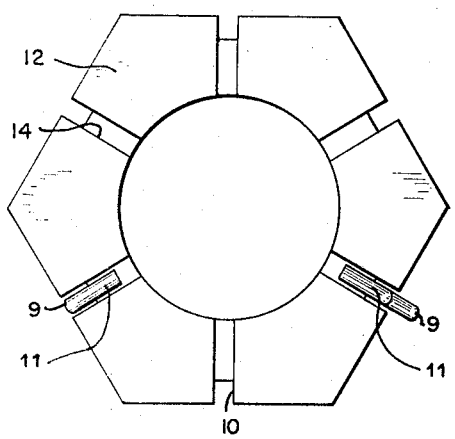

FIG. 2 shows a view of an upper plan of the lock nut of the present invention showing the hooking points of the clamps.

Figure 3:
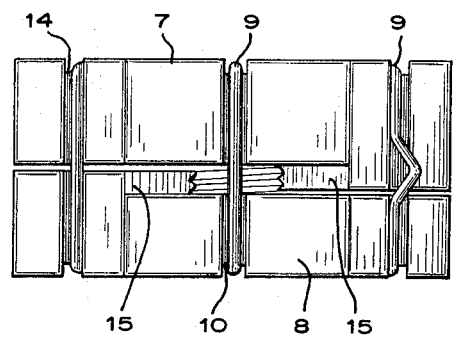

FIG. 3 shows a lateral view of the nut and the lock nut of the present invention in their coupled position by means of the utilization of the selected clamps.

Figure 4:
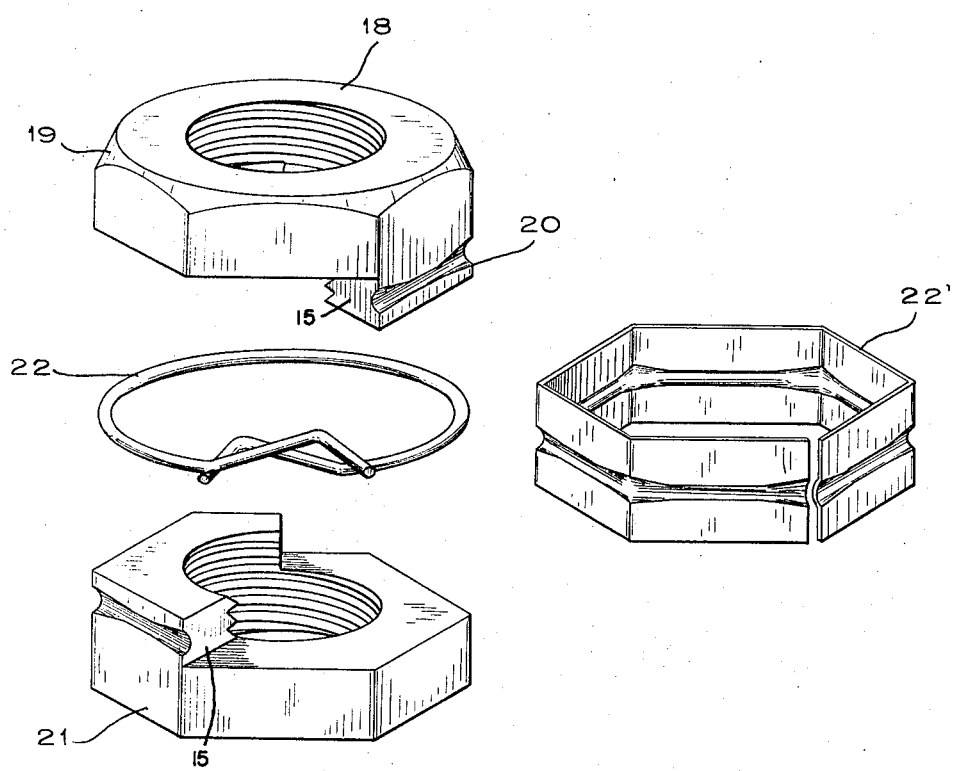

FIG. 4 shows a view in a conventional perspective of the nut and the lock nut of the present invention in the nature of the same which is characterized by the partial grooving on rabbet of the upper and lower caps respectively of the nut and of the lock nut.

The pressure wire or spring of the same type which determines the point of specific torsion to which the nut must be tightened is also illustrated in this figure.

Figures 5, 6:
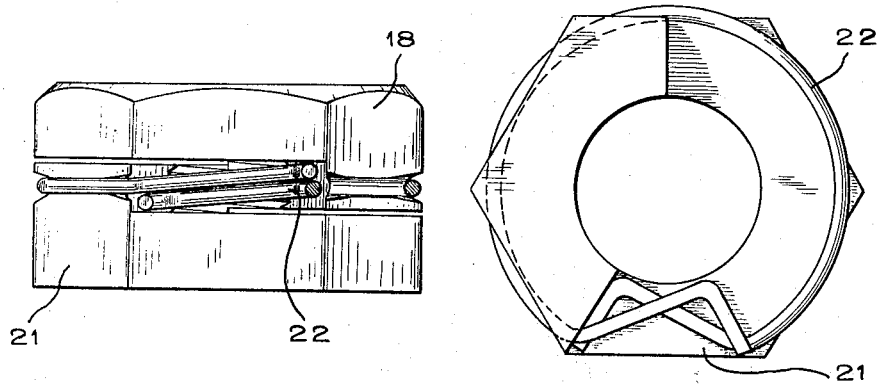

FIG. 5 shows a view of an upper plan of the nut showing the disposition of the pressure spring or wire which will determine the point of specific torsion.

FIG. 6 shows a lateral view of the nut and the lock nut of the present invention in the nature which is described and illustrating the coupling form between such elements by means of the utilization of the pressure wire or spring.

DESCRIPTION OF THE PREFERRED EMBODIMENTS

Figure 1:
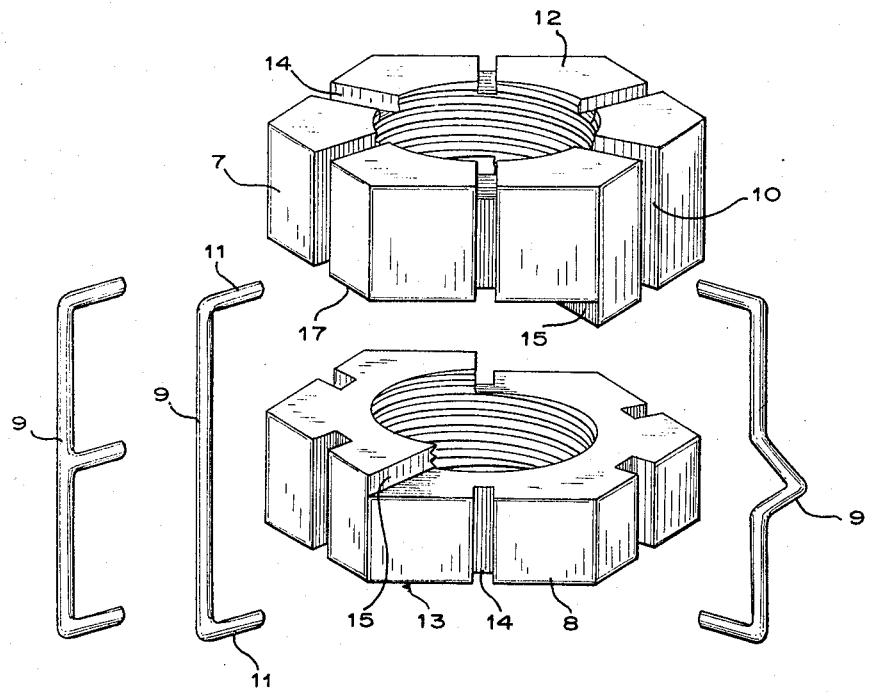
FIG. 1 illustrates a conventional perspective of the nut and lock nut of the present invention in its preferred form, that is, by means of a longitudinal grooving of the lateral walls and upper and lower caps of such elements.

Proceeding to a more accurate description of the present invention and particularly with regard to FIG. 1, 7 identifies the lock nut in the nature of the invention in which the coupling of the lock nut to the nut 8, is made by means of the utilization of clamps 9 of different shapes, which adjust to the longitudinal grooves 10 on both pieces. The foldings 11 of the clamps 9 hold these perfectly to the upper 12 and lower 13 caps of the nut 7 and the lock nut 8 respectively, by means of the angulated prolongations 14 of the longitudinal grooves 10. The cut and prolongations 15 practiced on the lower cap of the lock nut 7 and the upper cap of the nut 8, allow a better coupling of the pieces and the gliding in an inverted direction to the screwing of the surfaces of the nut 8 and the lock nut 7 which contact among themselves.

With regard to FIG. 2, 12 illustrates the upper portion of the lock nut 7 clearly appraising the angulated prolongations 14 of the longitudinal grooves 10 which the clamps 9 have and which angulated stops 11 hold the nut 8 to the lock nut 7 until the moment when the cube wrench or any other similar tool rotates and screws the nut and the lock nut to the degree of specific torsion bearable by the material of which the clamps 9 are manufactured.

Although it is not illustrated it has been conceived to head the lower portion of the lock nut 17 in order to prevent the cube wrench from going beyond the rabbet thus obtained and consequently tightening the nut to a greater or lesser degree than is desired. In FIG. 3 the nut 7 and the lock nut 8 are shown in a lateral view which allows a better appraisal of the disposition of the clamps 9 which can be restored once the operation of tightening is finished in order to prevent still with the best possible results, ulterior slipping of the respective screws and nuts.

In the nature of the invention illustrated in FIG. 4, a blunt angled 19 lock nut 18 can be appraised and a groove-like rabbeted base 20 of substantially one fourth part of a circumference in order to coincide with the grooved rabbet practiced on the opposite side of the nut 21. Both one fourth part of circumference rabbets will be effective to hold as coupling and regulator element of the specific torsion to which the pieces are to be adjusted, a frontcrossed circular wire or spring 22 or a front-cut steel laminated ring 22' slackened the moment the lock nut is rotated beyond the desired torsion depending on the use the invention is given. The same head of the lower portion of the lock nut can be used in this nature to prevent the passing of the cube wrench to the zone of the nut.

The disposition of the wire or spring 22 can be appraised in FIG. 5, that is, in the upper plan view of the nut, conceiving more solidly the regulation and coupling function of such spring or wire 22 in FIG. 6 in which by means of a lateral view the situation and definite holding forms of the lock nut 18 to the nut 21, can be appraised.

It must be understood that the form, materials and character which have been used to illustrate the invention are simple variations of the same, but that the novel principles which inform it persist independently of the other modifications that the experts might conceive in the art based upon the elements described.

I claim:

1. In a nut and lock nut coupled in one single unit to be tightened to a controlled torsion, the improvement characterized by comprising in combination a lower nut portion and an upper lock nut portion having coaxial threaded bores each defining a substantially continuous thread of like hand and pitch, the nut and the lock nut being correspondingly grooved on their exterior peripheral surfaces, clamps of metal or similar materials having rupture points adapted to rupture at a specific torsion received in aligned grooves in the nut and the lock nut, the lower face of the lock nut and the upper face of the nut having protuberances each extending throughout part of a circle less than 180°, the grooves of the nut and of the lock nut extending angularly onto the aforementioned upper and lower faces whereby angular extremities of the holding clamps are fixed therein, the protuberances having leading and trailing surfaces with respect to the direction in which the nut unit is to be driven, wherein the leading face of the protuberance on the lock nut and the trailing face of the protuberance on the nut are spaced apart prior to rupture of the clamps.

2. The improvement in accordance with claim 1 characterized furthermore by the inner thread or fillet of the nut and the lock nut being continuous with both pieces acting as one single unit, and wherein the clamps or holding elements which delimit the degree of specific torsion are used to prevent the gliding or loosening of the nut and of the lock nut once the adjustment of such pieces is finished.

3. A nut and lock nut combination, comprising: a lower nut portion and an upper lock nut portion each having coaxial threaded bores defining a substantially continuous thread of like hand and pitch, the lower face of the lock nut and the upper face of the nut having radially opposed protuberances each extending throughout part of a circle less than 180° and including end surfaces in circumferentially spaced relationship, the axial extremities of said protuberances and the remainder of the lower face of the lock nut and the upper face of the nut being substantially planar, each of said protuberances being externally laterally grooved, and a substantially circular wire or spring of selected expansion at a predetermined torsion positioned within the lateral grooves, whereby the nut and lock nut is held in position as a unit, the wire or spring including resilient means for maintaining the end surfaces in said circumferentially spaced relationship until said predetermined torsion is applied to the lock nut, whereupon the wire or spring is expanded, and the nut and the lock nut are permitted to move relative to each other.

* * * * *